(12) United States Patent
Nishimura et al.

(10) Patent No.: US 7,182,590 B2
(45) Date of Patent: Feb. 27, 2007

(54) MOLD CLAMPING MECHANISM OF INJECTION MOLDING MACHINE

(75) Inventors: Koichi Nishimura, Susono (JP); Naruhiro Nishimura, Minamitsura-gun (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/059,452

(22) Filed: Feb. 16, 2005

(65) Prior Publication Data
US 2005/0181091 A1   Aug. 18, 2005

(30) Foreign Application Priority Data
Feb. 17, 2004   (JP) ............... 2004-040377

(51) Int. Cl.
*B28B 5/00* (2006.01)
(52) U.S. Cl. ............ 425/451.6; 425/593; 425/DIG. 127
(58) Field of Classification Search ................ 425/593, 425/451.6, DIG. 127
See application file for complete search history.

(56) References Cited

U.S. PATENT DOCUMENTS

| | | | | |
|---|---|---|---|---|
| 2,298,043 | A * | 10/1942 | Dinzl ................ | 425/451.2 |
| 3,208,373 | A | 9/1965 | Bachelier | |
| 3,632,272 | A * | 1/1972 | Herbener ............ | 425/541 |
| 4,276,013 | A | 6/1981 | Bazzea | |
| 4,773,845 | A | 9/1988 | Nagura et al. | |
| 4,852,382 | A * | 8/1989 | Gietz et al. ........... | 72/406 |
| 5,350,291 | A * | 9/1994 | Kitajima ............ | 425/593 |
| 6,647,869 | B2 * | 11/2003 | Bornhorst et al. ...... | 100/257 |
| 6,830,446 | B2 * | 12/2004 | Harada et al. ........ | 425/451.6 |

FOREIGN PATENT DOCUMENTS

| | | |
|---|---|---|
| JP | 03-182319 | 8/1991 |
| JP | 07-08918 | 4/1995 |

OTHER PUBLICATIONS

EP Search Report for corresponding EP Application EP 05250890.0-1253.

* cited by examiner

*Primary Examiner*—Joseph S. Del Sole
*Assistant Examiner*—Maria Veronica Ewald
(74) *Attorney, Agent, or Firm*—Staas & Halsey LLP (57) ABSTRACT

A toggle type mold clamping mechanism for preventing the degradation of parallelism between stationary and movable platens, which is caused due to a clearance between a pin and a bushing, with use of a simple construction. A mold clamping force acting on the pin is transmitted through the bushing to a link L1, thereby moving the movable platen to perform mold clamping. A pre-pressure exerting in the same direction as the direction of a mold clamping force generated at the time of mold clamping is applied by a spring or the like to move the pin toward the link L1. Even a mold opening force is exerted at the time of mold opening, the pre-pressure c provided by the spring or the like keeps the position of the clearance δ between the pin and the bushing unchanged. Since the link L1 pulled by the spring or the like is moved to follow the pin (so that the pin is not moved alone by an amount of clearance δ), the parallelism between the stationary and movable platen is not degraded.

5 Claims, 5 Drawing Sheets

MOLD CLAMPING MECHANISM OF INJECTION MOLDING MACHINE

BACKGROUND OF THE INVENTION

1. Field of the Invention

The present invention relates to a toggle-type mold clamping mechanism of an injection molding machine.

2. Description of Related Art

In a mold clamping mechanism of an injection molding machine, a movable die must be moved parallel to a stationary die to perform mold closing, mold clamping, and mold opening. Especially for the production of precise molded products, requirements of a clearance around and parallelism between die guide pins are strict, requiring highly accurate parallelism not only at the tune of mold clamping, but also at the time of mold opening. This indicates that the stationary and movable platens, to which the stationary and movable dies are attached respectively, must be moved parallel to each other to perform mold closing and opening actions.

In a toggle type mold clamping mechanism using a toggle mechanism therefor, links constituting the toggle mechanism include pivot joints each comprising a pin and a bushing of a slide bearing. Since the pin rotates relative to the bushing, a clearance must be provided between the pin and the bushing, and thus the clearance cannot be zero. The clearance degrades the parallelism between the stationary platen (stationary mold) and the movable platen (movable mold) at the time of mold closing or mold opening.

Figure 8A:
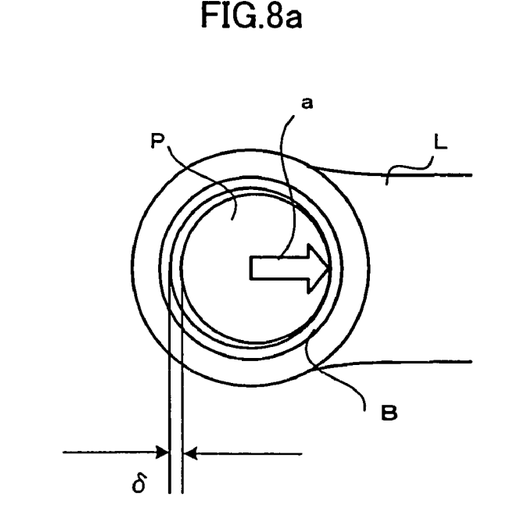
FIGS. 8a and 8b are explanatory views showing a conventional toggle type mold clamping mechanism in which the parallelism between stationary and movable platens is degraded due to the construction of a coupled portion of links where the links are coupled by a pin.
Figure 8B:
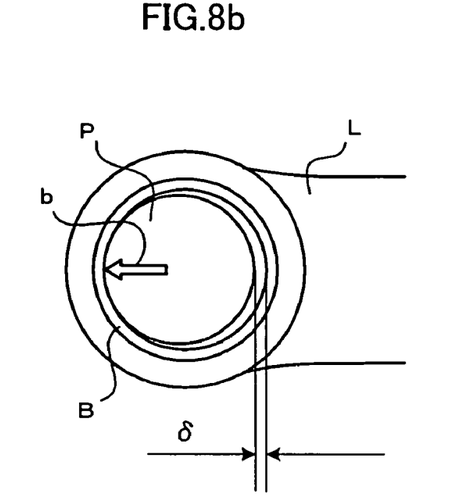

FIGS. 8a and 8b are explanatory views on the above point, in which L denotes a link; B, a bushing; and P, a pin. FIG. 8a shows a state at the time of mold clamping, in which a force of a driving source for mold clamping is transmitted to the pin P and to one end of the link L through the bushing B whereby the movable platen coupled to another end of the link is driven so that mold clamping is achieved. It is assumed here that the pin P is driven from the left to the right as shown by an arrow in FIG. 8a, and a mold clamping force a is transmitted to the link L. At this time, the clearance formed between the pin P and the bushing B is deviated to the left side in FIG. 8a where an amount of clearance is shown by δ. When the mold opening is performed from this state, the pin P is driven to the left. A mold opening force is shown by an arrow b in FIG. 8b. As shown in FIG. 8b, the pin P is moved by an amount corresponding to the clearance δ, independently of the link L. While the pin P is moved by the clearance δ, the link L can be moved freely without being restricted by the pin P.

As a result, even if the parallelism has been adjusted in the state shown in FIG. 8a in such a manner that the stationary platen (stationary die) and the movable platen (movable die) are in parallel to each other, there is a possibility that the parallelism is degraded during the mold opening shown in FIG. 8b due to the affection of the clearance δ. Conversely, even if the parallelism has been adjusted in the state shown in FIG. 8b, the parallelism can be degraded during the mold clamping shown in FIG. 8a.

To obviate the above problem, there is known a method to constitute each of pivot joints of toggle links in the form of a rolling bearing structure to reduce a radial clearance (see JP 2584325B).

Also known is to provide fluid-pressure cylinders at four corners of the stationary platen for pressing the movable platen in the direction away from the stationary platen, and actuate these fluid-pressure cylinders at start of mold opening to move the movable platen in the mold opening direction, thereby maintaining the parallelism (see JP 7-88918A).

When precise molded products are to be injection-molded, it is an essential matter to maintain the parallelism between the stationary and movable platens at the time of mold closing, mold clamping, and mold opening. Thus, even a slight change in the parallelism caused by the presence of a clearance between the pin and the bushing in the toggle mechanism may be a problem. A method in which the bearing adopted in JP 2584325B is used in order to obviate the above problem results in drawbacks that ease of assembly and maintenance is impaired and noise at the time of mold opening/closing increases.

The method shown in JP 7-88918A to use fluid-pressure cylinders not only requires the fluid-pressure cylinders, but also requires a driving source and control means therefor and further driving energy. A further problem is the necessity of adjusting the fluid-pressure cylinders to meet a die thickness each time a die change is made.

SUMMARY OF THE INVENTION

The present invention provides a toggle type mold clamping mechanism capable of, with use of a simple construction, preventing degradation of parallelism between stationary and movable platens, which would be caused at the time of mold closing and mold opening due to the presence of a clearance between a pin and a bushing of the mold clamping mechanism.

A toggle-type mold clamping mechanism of the present invention performs mold clamping by moving a movable platen of an injection molding machine. The mold clamping mechanism comprises: links pivotally connected by a pin and a first bushing fitted around the pin so as to be rotated to move the movable platen; and pre-pressure means for applying a pre-pressure between the pin and the first bushing in the same direction as that of a force acting between the pin and the bushing in the mold clamping.

The pre-pressure means may comprise a spring provided between a link to which the pin is fixed and a link to which the first bushing is fixed.

Alternatively, the pre-pressure means may comprise a second bushing fitted around the pin, a holding member for holding the second bushing, a bolt and a nut for connecting the holding member and a link to which the first bushing is fixed. In this case, the nut may be tightened on the bolt through a spring.

Another pre-pressure means may be constituted by bushings or cushioning members provided at both ends of the first bushing to be eccentric with respect to the first bushing. Further, another pre-pressure means may be constituted by a through hole, to which the pin is inserted, having end portions formed eccentrically with respect to a central portion of the through hole, and bushings or cushioning members provided in the end portions of the through hole.

Still another pre-pressure means may be constituted by a groove formed on an inner circumference of the first bushing or an outer circumference of the pin, and a bushing or a cushioning member provided in the groove to be eccentric with respect to the first bushing.

According to the present invention, the pre-pressure means produces the pre-pressure that is exerted in the same direction as the direction of the mold clamping force generated at the time of mold clamping, and therefore, the position of a clearance between the pin and the bushing is not changed between at the time of mold clamping and at the start of mold opening, so that the pin cannot only be moved by an amount of the clearance. For this reason, both the pin and the link are moved together, so that the movable platen coupled to the link is retreated, with the orientation thereof at the time of mold clamping kept unchanged, whereby the parallelism between the moving and stationary platens is maintained.

DETAILED DESCRIPTION

Figure 1:
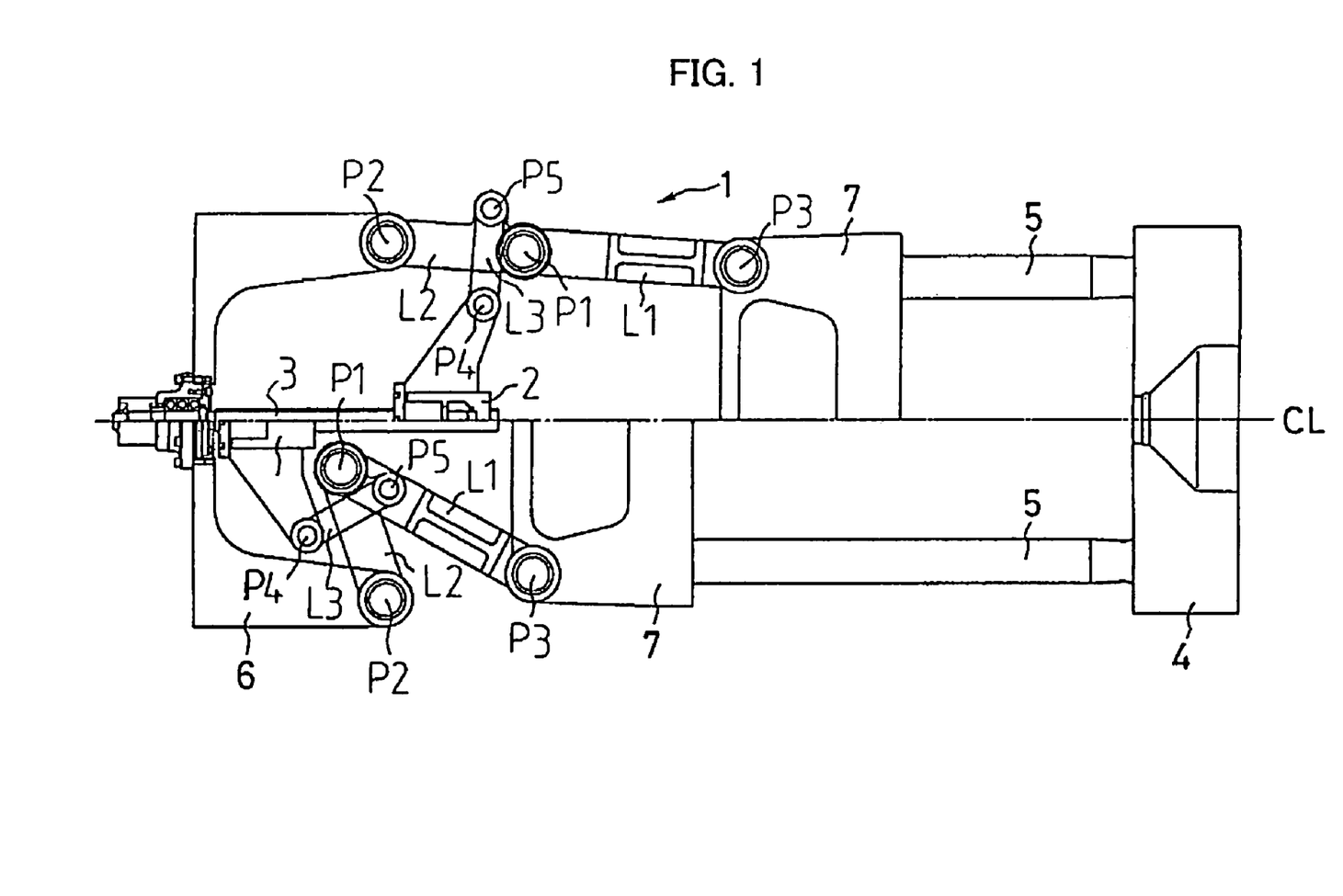
FIG. 1 is an explanatory view showing an example of a toggle type mold clamping mechanism to which the present invention is applied.

FIG. 1 shows an example of a toggle type mold clamping mechanism. An upper part of FIG. 1 (above the center line CL) shows a lockup state where the mold clamping is achieved by maximumly projecting a movable platen 7 toward a stationary platen 4, whereas a lower part of FIG. 1 shows a state where the maximum mold opening is achieved. The stationary platen 4 is coupled to a rear platen 6 through tie bars 5, and the movable platen 7 is attached to the rear platen 6 through a toggle mechanism 1. The movable platen 7 is driven by the toggle mechanism 1 so as to be moved along the tie bars 5 in the left and right directions in FIG. 1, whereby mold clamping is achieved. Although not illustrated in FIG. 1, a stationary die and a movable die are attached to the stationary platen 4 and the movable platen 7, respectively.

The toggle mechanism 1 includes a plurality of links L1–L3 coupled through pins P1–P5 to one another, a ball screw 3 driven by a driving source such as a servomotor (not shown), and a cross head 2 having a ball nut threadedly engaged with the ball screw 3. The movable platen 7 is driven by the driving source through the ball screw 3, the ball nut of the cross head 2, and the links L1–L3, so that the toggle mechanism 1 selectively assumes either the lockup state shown in the upper part of FIG. 1 or the maximum mold opening state shown in the lower part of FIG. 1.

In the mold clamping mechanism adapted to be driven by the aforementioned toggle mechanism, the present invention contemplates preventing the degradation of the parallelism between the stationary and movable platens at the time of mold closing and mold opening due to the presence of clearances between the links L1–L3 and the pins P1–P5 of the toggle mechanism. The toggle mechanism is not limited to one of the type shown in FIG. 1. The present invention is applicable to any toggle mechanism having links that are coupled to one another by means of pins and bushings.

Figure 2:
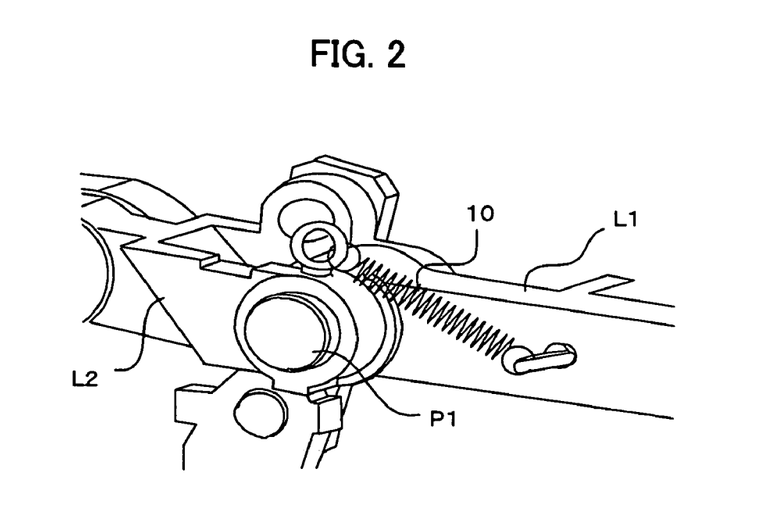
FIG. 2 is a perspective view showing an essential part of a coupled portion of links in a first embodiment of the present invention where the links are coupled by a pin.

FIG. 2 is a perspective view showing an essential part of a coupled portion of links in a first embodiment of the present invention where the links are coupled by a pin. In the first embodiment, an example in which the present invention is applied to a coupled portion of the links L1 and L2 where these links are coupled by the pin P1 shown in FIG. 1.

The pin P1 is fixed to the link L2, and the link L1 is coupled to the pin P1 through a bushing. The present embodiment is not different in this point from the conventional one, but different therefrom in that a spring 10 serving as pre-load means is disposed between the links L1 and L2, so that the link L2 is pulled by the spring 10 toward the link L1. In other words, the pin P1 attached to the link L2 is pulled toward the link L1, whereby a clearance between the pin and the bushing provided in the link L1 is deviated in one direction. The direction in which the pulling force produced by the spring 10 is exerted is substantially the same as the mold clamping direction at the time of mold clamping.

Figure 3A:
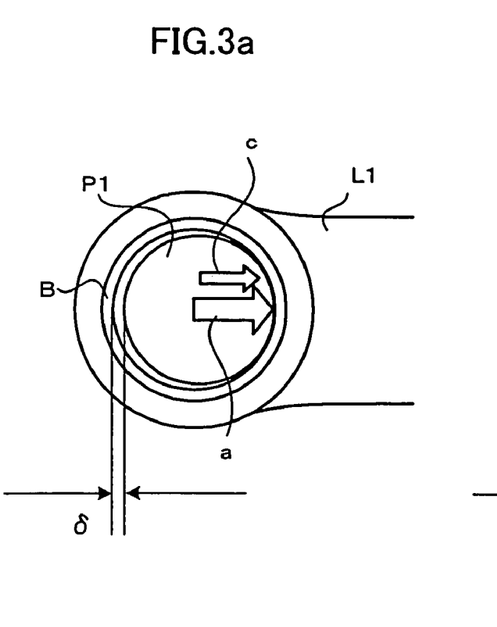
FIGS. 3a and 3b are explanatory views showing prepressure means of the present invention for applying a force by which the pin is urged toward the link.
Figure 3B:
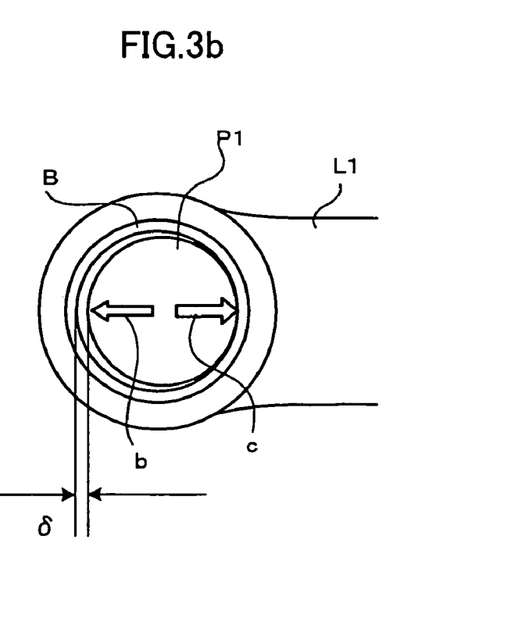

FIGS. 3a and 3b are explanatory views showing the force produced by the pre-load means (spring 10) and serving to pull the pin P1 toward the link L1.

FIG. 3a shows a state at the time of mold clamping, and FIG. 3b shows a state at start of mold opening. In FIGS. 3a and 3b, symbol B denotes the bushing. The spring 10 is disposed such that the spring 10 produces a force acting on the pin P1 in the direction that is substantially the same as the direction in which the mold clamping force a acts on the pin P1 at the time of mold clamping. More specifically, at the time of mold clamping, the mold clamping force a acts on the pin P1 as shown by arrow a in FIG. 3a, and pushes the movable platen 7 through the link L1 toward the stationary platen 4, whereby the mold clamping force is applied to the dies that are individually attached to the stationary and movable platens 4, 7. The spring 10 also applies a pre-load c in the direction substantially the same as the direction of the mold clamping force as shown by arrow c in FIG. 3a. As a result, a clearance δ is formed between the bushing B and the pin P1 on the side opposite the side on which the pin P1 is pushed toward the link L1.

When mold opening is performed, the pin P1 is driven in the direction opposite the direction of mold clamping force shown by arrow c as shown in FIG. 3b, and the force exerted for mold opening is smaller than the tension force (pre-load) c produced by the spring 10. Therefore, the spring 10 can never be stretched. As a result, the mold opening force b acting on the pin P1 is transmitted through the spring 10 to the link L1, so that the movable platen 7 is caused to move in the mold opening direction. In the mold opening state, the position where the clearance δ is formed is kept unchanged as shown in FIG. 3b, so that the positional relation between the pin P1 and the link L1 is maintained the same as that in the mold clamping state. Accordingly, the orientation of the movable platen does not change, and thus the parallelism between the stationary and movable platens is kept unchanged as compared to that achieved at the time of mold clamping.

In FIG. 2, the pin-coupled portion of the links L1, L2 where they are coupled by the pin P1 is shown. All the pin-coupled portions of the links of the toggle mechanism may be configured in such a manner that spring pre-loads c exerting in the same direction as the direction of the mold clamping force at the time of mold clamping are applied by the pins to the bushings provided in the links. A region in which the parallelism between the stationary and movable platens must be strictly maintained is a short region in which the contact of the movable die to the stationary die is about to be completed or has been completed. On the other hand, in a region where both the dies are fully separated from each other, the necessity for strictly managing the parallelism between the stationary and movable platens is reduced. Thus, it is enough to maintain the parallelism in the short region corresponding to between a state where the toggle mechanism is locked up and a state where it is about to be nearly locked up. In this connection, the spring 10 serving as the pre-load means may be provided only in one or more pin-coupled portions affecting the aforementioned short region. For example, only the pins P1, P2 and P3 in FIG. 3 may be provided with the pre-load means in terms of the spring 10.

Figure 4:
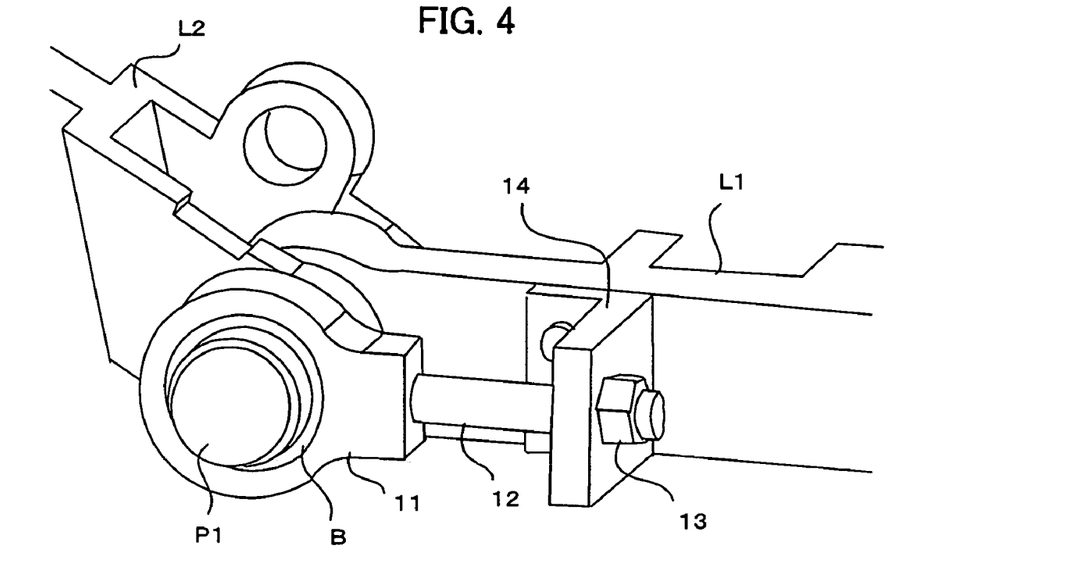
FIG. 4 is an explanatory view showing an essential part of a second embodiment of the present invention.

FIG. 4 is a view for explaining essential part of a second embodiment of the present invention, in which pre-load means is provided that is different from the spring 10 used in the first embodiment.

As compared to the first embodiment, the second embodiment is the same in that the link L1 is coupled through the bushing to the pin P1 provided in the link L2, but different in the pre-load means that applies the pre-load to the pin P1 in the direction of the mold clamping force at the time of mold clamping. In the second embodiment, there is provided a pull-in member 11 having a bushing B into which the pin P1 is fitted. A bolt 12 is fixed to the pull-in member 11, and a distal end of the bolt extends through a hole formed in a bracket member 14 fixed to the link L1 and is threadedly engaged with a nut 13. By tightening the nut 13, the pull-in member 11 is pulled toward the bracket member 14 or toward the link L1, so that the pin P1 is pulled toward the link L1, thereby applying the pre-load c to the pin P1 in the direction of the mold clamping force produced when the mold clamping is performed. As in the case of the first embodiment, the pre-load means of the second embodiment can be applied not only to the pin P1 but also to one or more other pins of the toggle mechanism.

Figure 5:
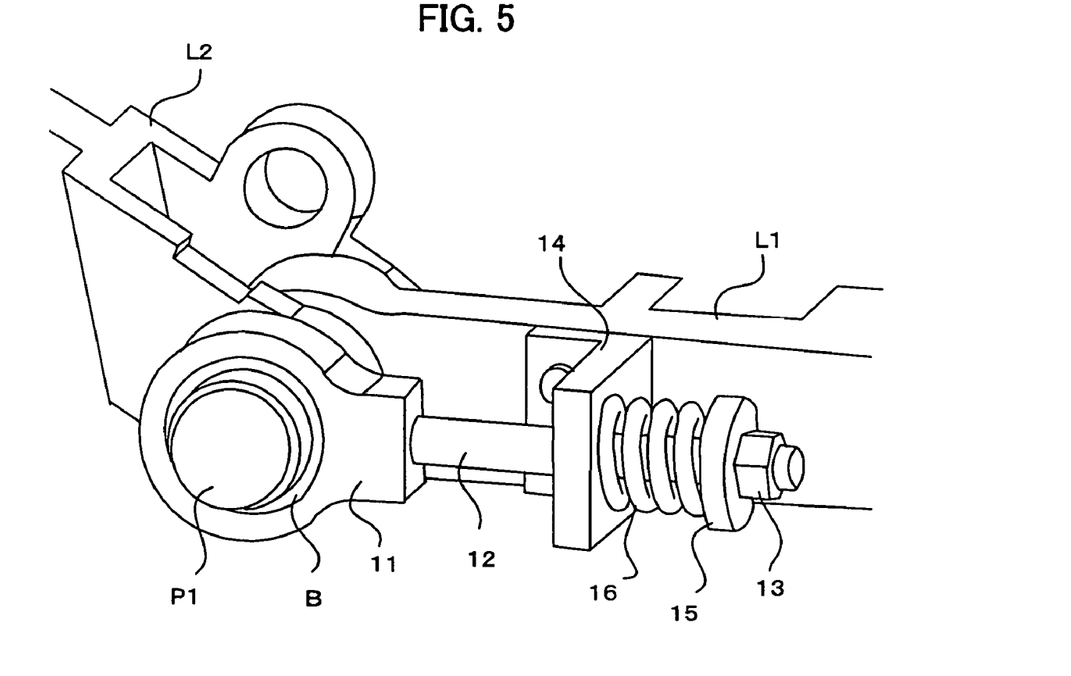
FIG. 5 is an explanatory view showing an essential part of a third embodiment of the present invention.

FIG. 5 is a view for explaining essential part of a third embodiment of the present invention, in which a spring 16 is further provided in the pre-load means used in the second embodiment, so as to apply the pre-load c to the pin P1 in the direction of the mold clamping force. The third embodiment is only different from the second embodiment in that the spring 16 is provided between the bracket member 14 and a spring seat member 15, but the other elements are the same as those of the second member. In the third embodiment, the nut 13 threadedly engaged with the bolt 12 is tightened, whereby the spring 16 whose one end is in press contact with the bracket member 14 is compressed and produces a reaction force, which is applied to the spring seat member 15 and the nut 13. By means of the reaction force, the bolt 12 and the pull-in member 11 integral therewith are urged toward the link L1, whereby the pre-load c exerting in the direction of the mold clamping force is applied to the pin P1.

Figure 6A:
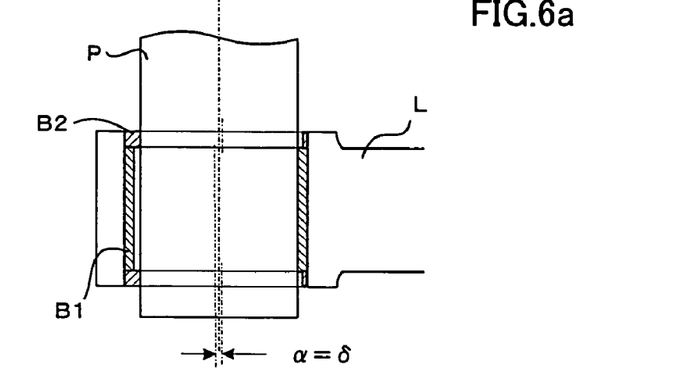
FIGS. 6a and 6b are explanatory views showing an essential part of a fourth embodiment of the present invention.
Figure 6B:
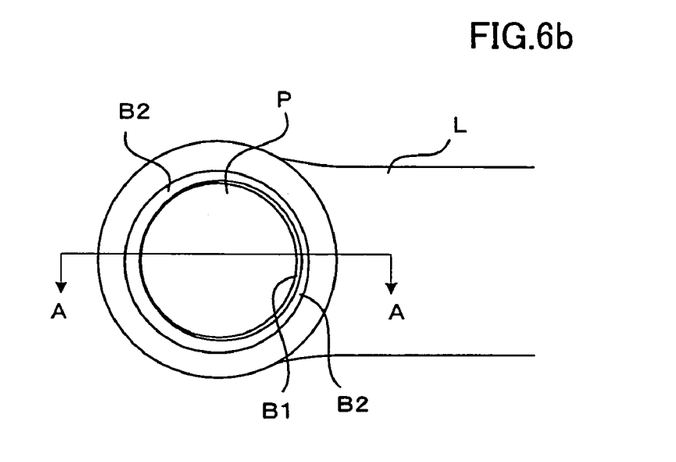

FIGS. 6a and 6b are explanatory views showing essential part of a fourth embodiment of the present invention.

The fourth embodiment is designed to pull the pin toward the direction of a mold clamping force generated at the time of mold clamping, to thereby apply the pre-pressure. In the fourth embodiment, second bushings B2 formed to be eccentric by an amount of the clearance δ between the pin and the bushing are disposed at both ends of the first bushing B1, which is the main bushing. In FIGS. 6a and 6b, symbols L and P denote the link and the pin, respectively. FIG. 6b is a view seen in the axial direction of the pin, and FIG. 6a is a section view taken along the line A—A shown in FIG. 6b. The state shown in FIGS. 6a and 6b is a state at the time of mold clamping, in which the second bushings B2 are disposed eccentrically in the direction of the mold clamping force generated at the time of mold clamping with respect to the first bushing B1. With this arrangement, the pin P is urged toward substantially the same direction as the direction of the mold clamping force generated at the time of mold clamping, whereby the pre-pressure is applied so that the pin P is in urged contact with the right side of the inner peripheral face of the first bushing B1 as shown in FIGS. 6a and 6b. As a result, even when the mold opening is started, the relationship between the pin P and the bushing B1 or between the pin P and the link L is maintained by means of the second bushings B2, whereby the parallelism between the stationary paten 4 and the moving plate 7 is maintained. Meanwhile, the pre-pressure means may be constituted by eccentric cushioning members, instead of using the second bushings B2. Alternatively, the hole to which the pin is fitted may be constituted by an eccentric hole, and bushings or cushioning members may be fitted in the eccentric hole. Specifically, the hole, to which the pin is fitted, is formed to have both ends (corresponding to parts where the second bushings B2 are disposed as shown in FIG. 6a) whose shape is such that the center axis is eccentric relative to a central part of the hole (corresponding to a part where the first bushing B1 is disposed), and bushings or cushioning members are fitted in the hole, whereby an arrangement similar to that of the fourth embodiment shown in FIGS. 6a and 6b can be achieved.

Figure 7:
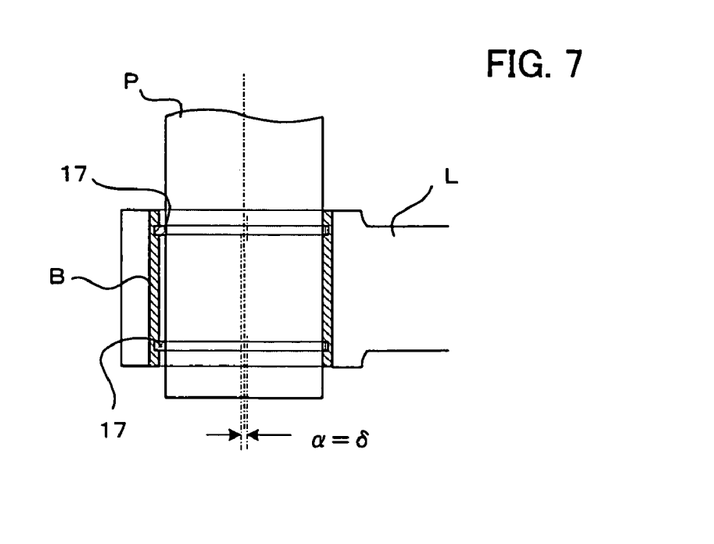
FIG. 7 is an explanatory view showing an essential part of a fifth embodiment of the present invention.

FIG. 7 is an explanatory view showing an essential part of a fifth embodiment of the present invention.

In the fifth embodiment, grooves are formed on both sides of the bushing B, and cushioning members (or bushings) 17 formed to be eccentric by an amount of the clearance δ between the pin P and the bushing B are fitted in the grooves, whereby the pre-pressure means is provided. The cushioning members (or the bushings) are disposed so that the direction of their eccentricity conforms to the direction of mold clamping force generated at the time of mold clamping. Also in the fifth embodiment, when the mold clamping is performed, the pre-pressure is applied to the pin P by the cushioning members (or the bushings) 17 in the direction of mold clamping force, whereby the pin is urged against the bushing and the parallelism between the stationary platen 4 and the movable platen 7 is maintained even when the mold opening is started, as in the fourth embodiment.

What is claimed is:

1. A toggle-type mold clamping mechanism for performing mold clamping by moving a movable platen of an injection molding machine, comprising:
   links pivotally connected by a pin and a first bushing fitted around the pin so as to be rotated to move the movable platen; and
   pre-pressure means for applying a pre-pressure between the pin and the first bushing in the same direction as that of a force acting between the pin and the first bushing in the mold clamping to thereby prevent change of a clearance between said pin and said first bushing,
   wherein said pre-pressure means comprises a second bushing fitted around the pin, a holding member for holding the second bushing, a bolt and a nut for connecting said holding member and a link to which the first bushing is fixed.

2. A mold clamping mechanism according to claim 1, wherein the nut is tightened on the bolt through a spring.

3. A toggle-type mold clamping mechanism for performing mold clamping by moving a movable platen of an injection molding machine, comprising:

links pivotally connected by a pin and a first bushing fitted around the pin so as to be rotated to move the movable platen; and pre-pressure means for applying a pre-pressure between the pin and the first bushing in the same direction as that of a force acting between the pin and the first bushing in the mold clamping to thereby prevent change of a clearance between said pin and said first bushing, wherein said pre-pressure means comprises bushings or cushioning members provided at both ends of the first bushing to be eccentric with respect to the first bushing.

4. A toggle-type mold clamping mechanism for performing mold clamping by moving a movable platen of an injection molding machine, comprising:

links pivotally connected by a pin and a first bushing fitted around the pin so as to be rotated to move the movable platen; and pre-pressure means for applying a pre-pressure between the pin and the first bushing in the same direction as that of a force acting between the pin and the first bushing in the mold clamping to thereby prevent change of a clearance between said pin and said first bushing, wherein said pre-pressure means comprises a through hole, to which the pin is inserted, having end portions formed eccentrically with respect to a central portion of the through hole, and bushings or cushioning members provided in the end portions of the through hole.

5. A toggle-type mold clamping mechanism for performing mold clamping by moving a movable platen of an injection molding machine, comprising:

links pivotally connected by a pin and a first bushing fitted around the pin so as to be rotated to move the movable platen; and pre-pressure means for applying a pre-pressure between the pin and the first bushing in the same direction as that of a force acting between the pin and the first bushing in the mold clamping to thereby prevent change of a clearance between said pin and said first bushing, wherein said pre-pressure means comprises a groove formed on an inner circumference of the first bushing or an outer circumference of the pin, and a bushing or a cushioning member provided in the groove to be eccentric with respect to the first bushing.

* * * * *

UNITED STATES PATENT AND TRADEMARK OFFICE
CERTIFICATE OF CORRECTION

PATENT NO. : 7,182,590 B2  Page 1 of 1
APPLICATION NO. : 11/059452
DATED : February 27, 2007
INVENTOR(S) : Koichi Nishimura et al.

It is certified that error appears in the above-identified patent and that said Letters Patent is hereby corrected as shown below:

Column 1, Line 14, change "tune" to --time--.

Column 7, Line 5, change "iniection" to --injection--.

Column 7, Line 20, change "iniection" to --injection--.

Column 8, Line 10, change "iniection" to --injection--.

Signed and Sealed this

Twelfth Day of June, 2007

JON W. DUDAS
*Director of the United States Patent and Trademark Office*